United States Patent [19]

Yoda et al.

[11] Patent Number: 4,553,918
[45] Date of Patent: Nov. 19, 1985

[54] TIRE MOLDING MOLD

[75] Inventors: Yasutada Yoda; Seisuke Sueyasu, both of Higashimurayama; Shoji Futamura, Kawasaki, all of Japan

[73] Assignees: Bridgestone Corporation, Tokyo; Institute of Technology & Precision Electrical Discharge Work's, Kanagawa, both of Japan

[21] Appl. No.: 608,590

[22] Filed: May 9, 1984

[30] Foreign Application Priority Data

May 30, 1983 [JP] Japan ................................ 58-95302
Sep. 29, 1983 [JP] Japan ............................... 58-181506
Sep. 29, 1983 [JP] Japan ............................... 58-181507
Nov. 7, 1983 [JP] Japan ............................... 58-208467

[51] Int. Cl.4 .......................................... B29H 5/02
[52] U.S. Cl. ................................................... 425/46
[58] Field of Search ..................... 425/28 R, 28 D, 35, 425/46

[56] References Cited

U.S. PATENT DOCUMENTS 1,899,258 2/1933 Bush ................................... 425/46 X
1,943,947 1/1934 Bungay ................................. 425/46

Primary Examiner—J. Howard Flint, Jr.
Attorney, Agent, or Firm—Sughrue, Mion, Zinn Macpeak & Seas

[57] ABSTRACT

A tire molding mold comprising a profile ring having an inner circumferential surface corresponding to the outer profile of a tire being molded, including at least the tread surface thereof, and a net ring having a faying surface fitted and joined to the inner circumferential surface of the profile ring and consisting of a network of ribs and/or lugs for forming the grooves of the tire being molded; the net ring being disposed on the profile ring wholly, or with the part thereof removed.

7 Claims, 51 Drawing Figures

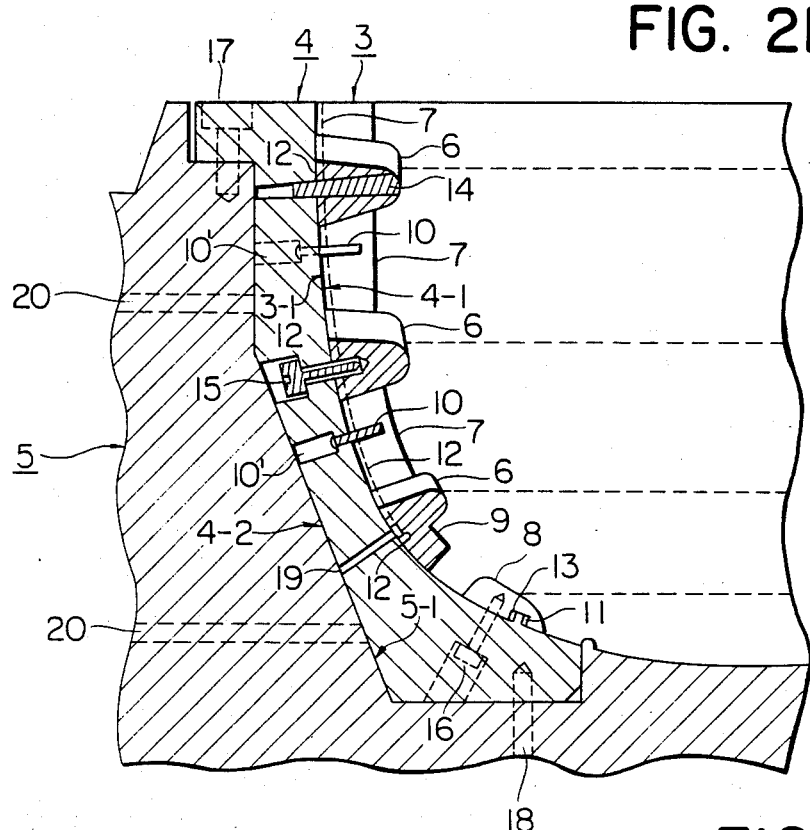
FIG. 2B
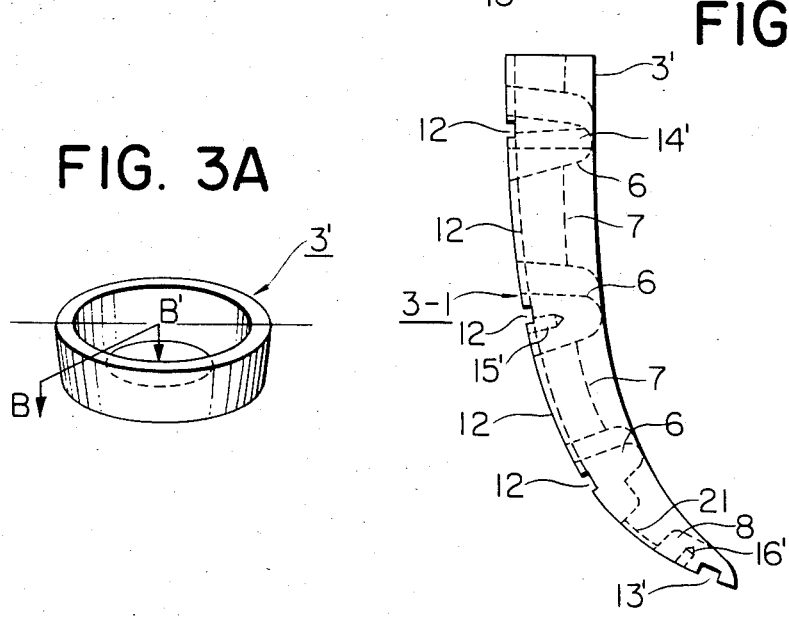
FIG. 3A
FIG. 3B

FIG. 8A  FIG. 8B  FIG. 8C
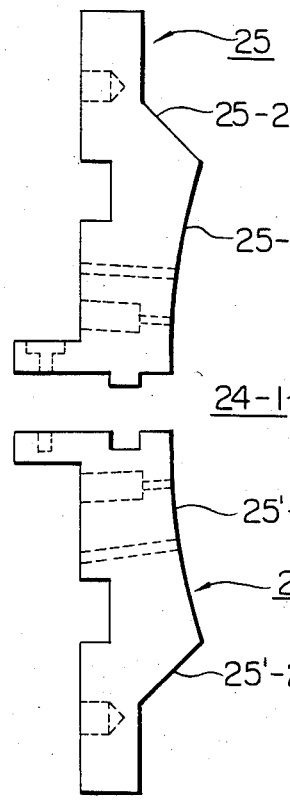
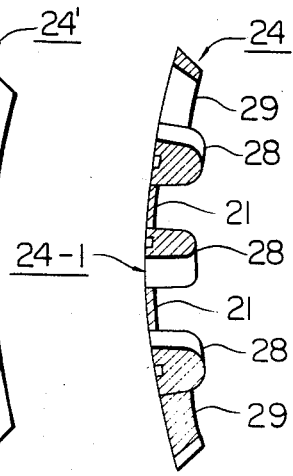
FIG. 9
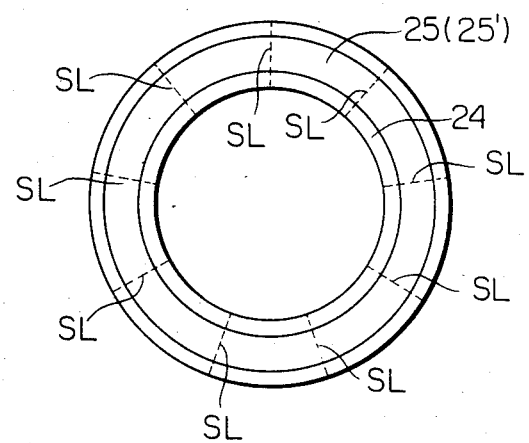

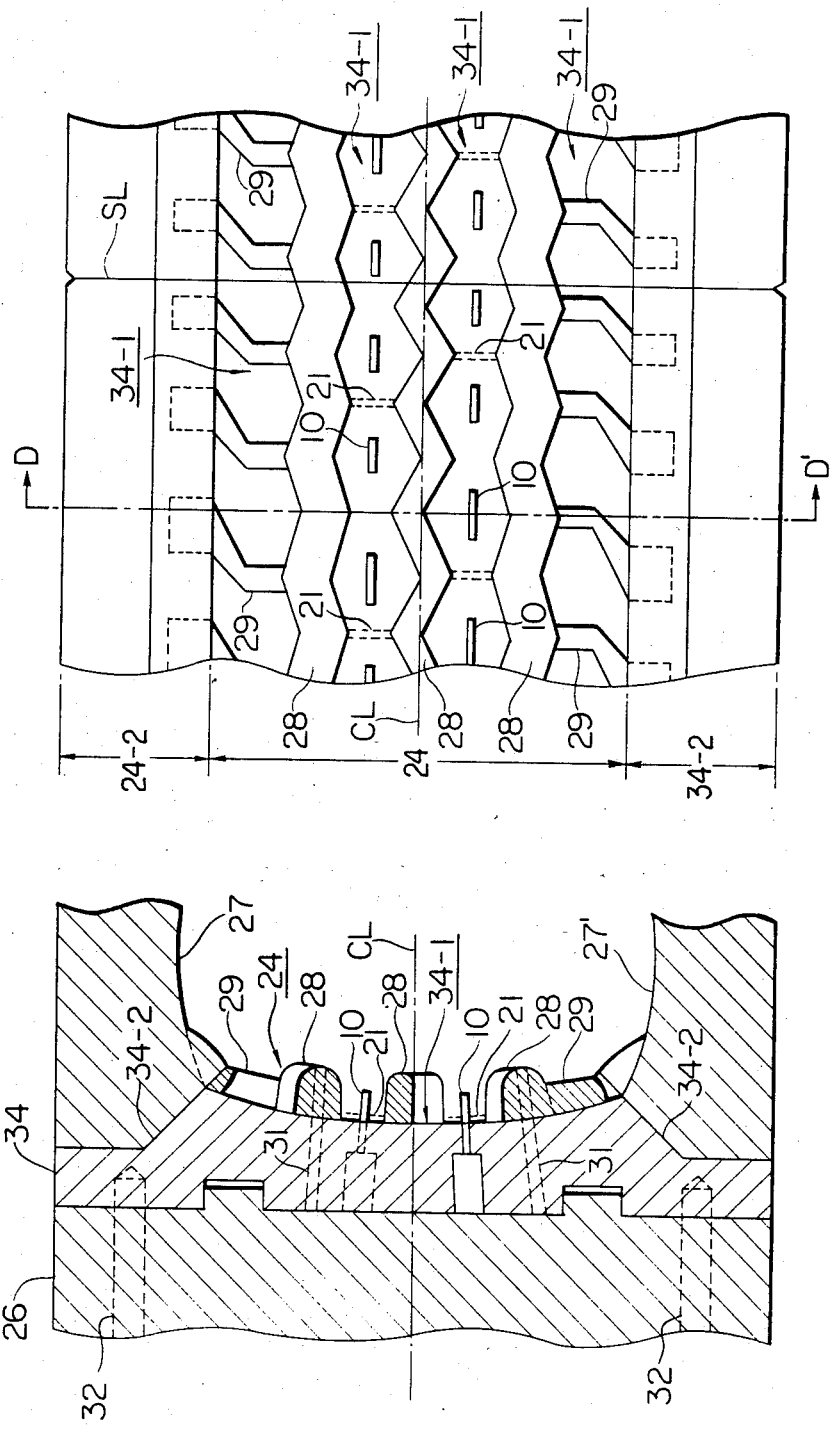

FIG. 12A
FIG. 12B  FIG. 12C
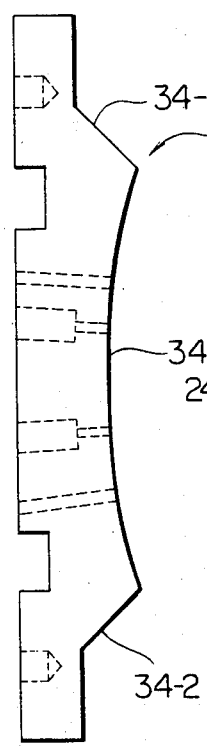
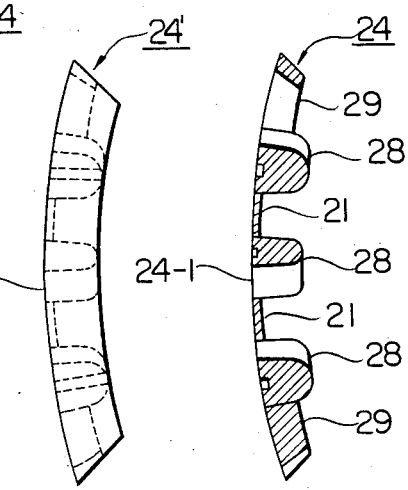
FIG. 12D
FIG. 13
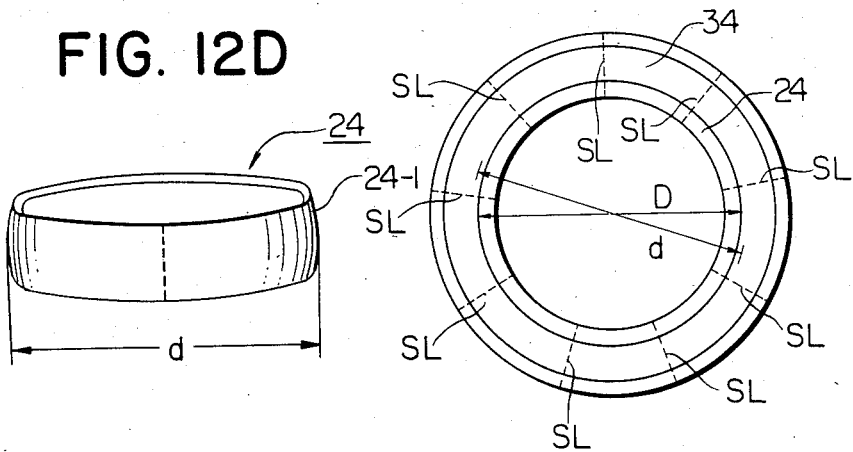

TIRE MOLDING MOLD

BACKGROUND OF THE INVENTION

1. Field of the Invention

This invention relates generally to a tire molding mold and more particularly to a tire molding mold comprising a profile ring having an inner circumferential surface corresponding to the outer profile of a tire being molded, including at least the tread surface thereof, and a net ring in contact with and joined to the inner circumferential surface of the profile ring and consisting of a network of ribs and lugs for forming the grooves of the tire being molded; the net ring being disposed on the profile ring.

2. Description of the Prior Art

In general, a tire molding mold has on the inner surface thereof a profile corresponding to the outer circumferential surface of a tire being molded, that is, a tread portion 1 corresponding to the tread surface of the tire and projections 2 corresponding to the grooves of the tire, as shown in FIG. 1. As is well known, the steering stability, travelling performance, road holding performance and noise reduction performance of a tire depend largely on the profile formed by the tread portion 1 and the projections 2 and the dimensional accuracy thereof.

A tire molding mold has heretofore been manufactured by integrally forming the tread portion 1 and the projections 2, or by welding the projections 2 on the inner circumferential surface comprising the tread portion 1, using the plaster mold process, sand mold process, ceramic molding process, metal mold process and other precision molding processes, engraving process, electro-discharge forming process and other manufacturing methods. With these conventional manufacturing methods, therefore, an entire metal mold has to be replaced with a new one every time the profile of a tire is remodelled to improve the performances of the tire, and it is extremely difficult to manufacture tire molding molds having accurate concentricity and roundness. Furthermore, the conventional manufacturing methods involve enormous manhours in final adjustment and finishing, for example, in the final stages of manufacture. As a result, tire molding molds manufactured with these conventional methods involve high manufacturing costs and a long manufacturing time.

SUMMARY OF THE INVENTION

It is an object of this invention to provide a tire molding mold that can be manufactured with high accuracy at substantially reduced manufacturing cost and reduced manufacturing time, and the method of manufacturing the same by constructing the tire molding mold of a profile ring having an inner circumferential surface corresponding to the outer profile of the tire being molded, including at least the tread surface thereof, and a net ring, having a faying surface in contact with and joined to the inner circumferential surface of the profile ring and consisting of a network of ribs and lugs for forming the grooves of the tire being molded; the net ring being disposed on the inner circumferential surface of the profile ring.

It is another object of this invention to provide a tire molding mold of a split mold type, which is advantageous in terms of both accuracy and cost, and the method of manufacturing the same by forming a plurality of tread segments comprising the tire molding mold of the split mold type by dividing the net ring and the profile ring.

It is still another object of this invention to provide a tire molding mold having blades that can be easily, securely and accurately installed on the inner circumferential surface of the mold.

It is a further object of this invention to provide a sturdy tire molding mold comprising a net ring and a profile ring by reinforcing thin-walled lugs.

BRIEF DESCRIPTION OF THE DRAWINGS

FIG. 2 shows a tire molding mold embodying this invention. FIG. 2B is a cross-sectional view taken along line A-A' in FIG. 2A.

FIGS. 3A through E are diagrams explaining the net ring shown in FIG. 2.

FIG. 7 is another embodiment of the tire molding mold of this invention.

FIGS. 8A–8C are schematic diagrams illustrating the techniques of processing with the profile ring and ring net components.

FIG. 9 is a diagram of the assembled ring net and profile rings of assistance in explaining manufacturing method of the embodiment shown in FIG. 7.

FIG. 11 shows still a further embodiment of this invention. FIG. 11A is a cross-sectional view, and FIG. 11B is a developed plan view of the tread portion.

FIGS. 12A through 12D and 13 are diagrams of assistance in explaining a manufacturing method of the embodiment shown in FIG. 11.

FIG. 16 is still a further embodiment of this invention.

DETAILED DESCRIPTION OF THE INVENTION

Figure 1:
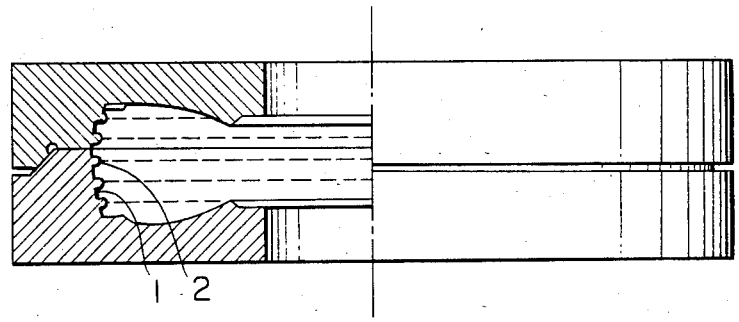
FIG. 1 is a diagram of assistance in explaining a typical example of a tire molding mold.

A basic embodiment of a tire molding mold according to this invention and the manufacturing method thereof will be explained in the following, referring to FIGS. 2 through 6.

In the figures, reference numeral 3 refers to a net ring; 3' to a blank of the net ring 3; 3-1 to a faying surface; 4 to a profile ring; 4-1 to the inner circumferential surface of the profile ring 4; 4-2 to the outer circumferential surface of the profile ring 4; 5 to a holder; 5-1 to the inner circumferential surface of the holder 5; 6 to a rib; 7 to a lug; 8 to shoulder projections (which are equivalent to what are termed as lugs in this invention, but are referred to as shoulder projections to distinct from the lugs); 9 through 11 to blades; 10' to blade holes; 12 to vent grooves; 13 to a blade machining allowance; 13' to a mating groove for the projection 13; 14 to a tapered pin; 14' to a tapered pin hole; 15 through 18 to bolts; 15' through 18' to threaded holes; 15" through 18" to bolt holes; 19 and 20 to vent holes; 21 to connecting members; and 22 and 23 to electrodes, respectively.

Figure 2A:
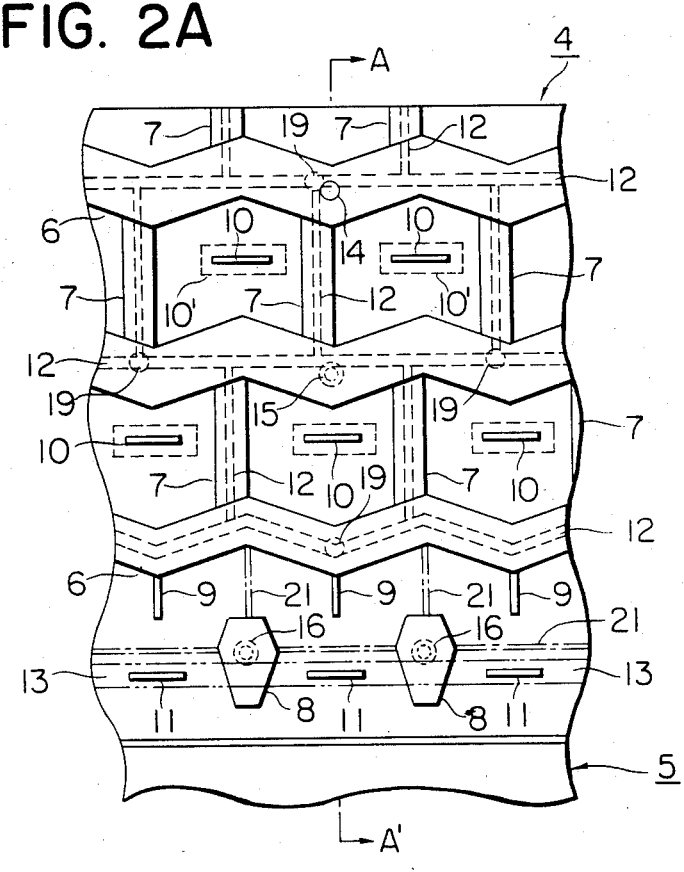
FIG. 2A is a developed plan view of the mold surface.

An embodiment of this invention shown in FIGS. 2A and 2B is a tire molding mold constructed of a net ring 3, a profile ring 4 and a holder 5. The net ring 3 is fixedly fitted to the profile ring 4 by means of a tapered pin 14 (a straight pin may be used if necessary) or bolts 15 and 16, and then the profile ring 4 is fixedly fitted to a holder 5 by means of bolts 17 and 18. The inner circumferential surface 4-1 of the profile ring 4 corresponds to the tread surface of the tire being molded, and ribs 6, lugs 7, shoulder projections 8, blades 9, and blades 10 and 11 provided on the profile ring 4 correspond to the grooves of the tire being molded.

Figure 3C:
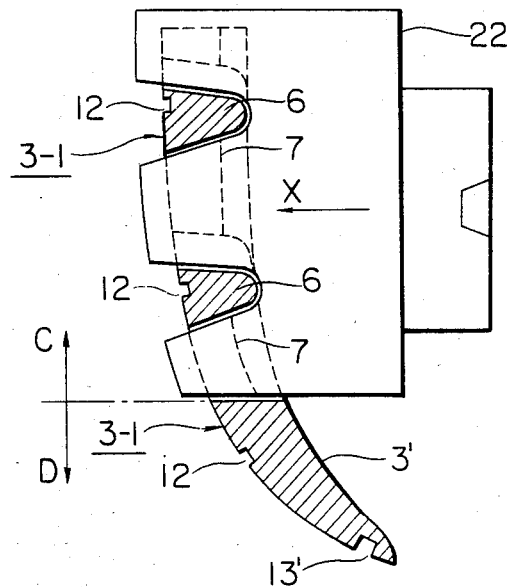
Figure 3D:
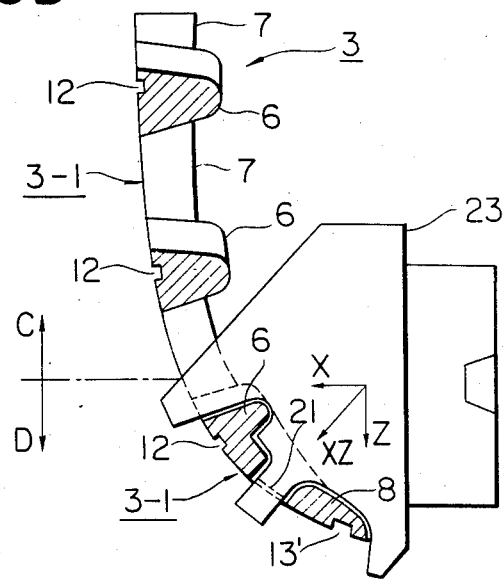
Figure 3E:
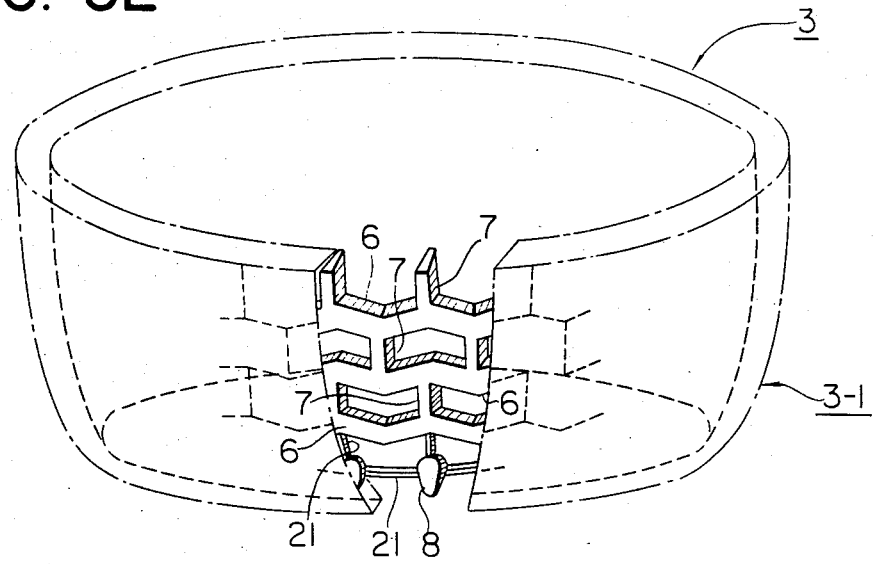

The net ring 3 is made mainly of iron or aluminum, and formed into a network, together with the ribs 6, 6 and 6, lugs 7, 7, . . . and shoulder projections 8, 8, . . . with the lost wax, ceramic mold or other precision casting process, or the electro-discharge machining process, as shown in the perspective view of FIG. 3E. Connecting members 21, 21, . . . connect the shoulder projection 8 with the rib 6, or the shoulder projections 8 with each other, and are removed after the net ring 3 has been positioned on the profile ring 4. That is, the connecting member 21 as shown by alternate long and short dash lines in FIG. 2A are removed after the aforementioned positioning.

Next, the process in which the net ring 3 is manufactured with the electro-discharge machining process will be described, referring to FIGS. 3A through E.

First, a blank 3' of the net ring 3 as shown in FIG. 3A. In manufacturing the net ring blank 3', at least the faying surface 3-1 thereof must be finished with high precision using, for example, an NC lathe. FIG. 3B is a cross-sectional view taken along line B-B' in FIG. 3A. Vent grooves 12 for discharging the gas generated during tire molding are provided on the faying surface 3-1 of the net ring blank 3' (the method of discharging the gas will be described later), as shown in FIG. 3B. The vent grooves 12 are formed along the ribs 6 and the lugs 7, as shown in FIG. 2A. Furthermore, a mating groove 13' corresponding to a blade machining allowance 13 provided on the profile ring 4, which will be described later, tapered pin holes 14', threaded holes 15' and 16' are also formed. Then, the ribs 6, the lugs 7, the shoulder projections 8 and the connecting members 21 as shown by dotted lines in FIGS. 3C and 3D are formed by electro-discharge machining. The electro-discharge machining may be performed essentially in the same manner as proposed previously by the present applicant (for example, the Japanese Patent Application No. 1983/33994). Detailed description of the machining method has therefore been omitted. As shown in FIGS. 3C and 3D, however, the portion shown by an arrow C in the figures is formed by electro-discharge machining by feeding the electrode 22 in the direction shown by an arrow X, while the portion shown by an arrow D is formed by feeding the electrode 23 in the direction shown by an arrow XZ as the composite direction of the directions X and Z. A perspective view of the net ring 3 manufactured in this manner is shown in FIG. 3E. In the foregoing, the electro-discharge machining of the net ring 3 used for this invention has been described, the net ring 3 may be manufactured by any of the aforementioned precision casting methods.

Next, description will be made on the profile ring 4, referring to FIG. 4. The profile ring 4 used for this invention has the inner circumferential surface 4-1 corresponding to the outer profile of the tread surface of a tire being molded, and the blade machining allowance 13 which mates with the mating groove 13' and out of which the blades 11 are carved is provided on the inner circumferential surface 4-1 of the profile ring 4. Also provided are the bolt holes 15" and 16" into which the bolts 15 and 16 are inserted to fixedly fit the net ring 3 on the profile ring 4; the tapered pin hole 14' for setting the tapered pin 14; the vent hole 19 provided on the outer circumferential surface 4-2 extending through the inner circumferential surface 4-1 at locations corresponding to the vent grooves 12 on the net ring 3; the bolt holes 17" into which the bolts 17 are inserted to fixedly fit the profile ring 4 on the holder 5; and the threaded holes 18' for setting the bolts 18, as shown in FIG. 2B. Furthermore, when the blades 10 as shown in FIGS. 2A and 2B, the blade holes 10' for inserting the blades 10 are also provided on the profile ring 4. It is relatively difficult to form thin blades 10, and whose height is extremely high relative to the thickness thereof as shown in FIGS. 2A and 2B, integrally with the profile ring 4. To cope with this, the blades 10 of a desired size may be machined separately and inserted into the blade holes 10' and fixedly fitted on the profile ring 4 with welding or brazing, as shown in FIG. 2B. (The method of fitting the blades 10 will be described in detail later.) It is easy, on the other hand, to form the blades 11 as shown in FIG. 2, whose height is not so high compared with the thickness thereof integrally with profile ring 4. That is, the blades 11 can be carved out of the blade machining allowance 13 by removing the excess metal (the portions shown by alternate long and two short dashes lines in FIG. 2A) of the blade machining allowance 13, other than the blades 11, with electro-discharge machining. In addition to the blades 11, lugs such as the shoulder projections 8, for example, may be provided on the inner circumferential surface 4-1 of the profile ring 4. In other words, not all the ribs and lugs have to be provided on the net ring 3.

Figure 5:
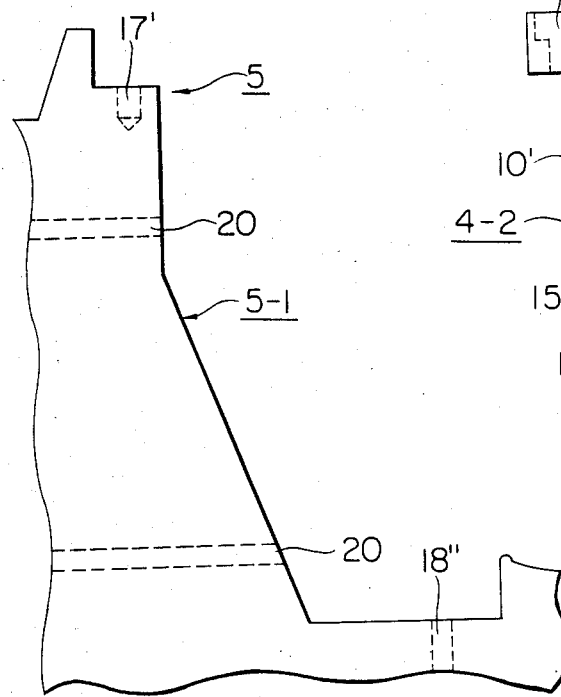
FIG. 5 is a diagram explaining the holder shown in FIG. 2.

Furthermore, the holder 5 for fixedly fitting the profile ring 4 is shown in FIG. 5. The inner circumferential surface 5-1 of the holder 5 is formed so as to correspond to the outer circumferential surface 4-2 of the profile ring 4. On the holder 5, the threaded holes 17' for the bolts 17 and the bolt holes 18" for the bolts 18 to fixedly fit the profile ring 4 (refer to FIG. 2B.), and the vent holes 20 passing through the inner circumferential surface 5-1 and the outer circumferential surface thereof (not shown) of the holder 5 are provided.

Figure 4:
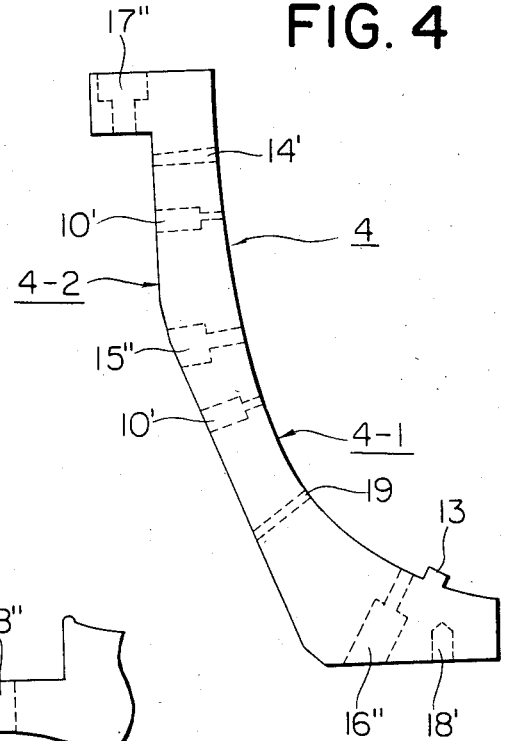
FIG. 4 is a diagram explaining the profile ring shown in FIG. 2.

The embodiment of this invention shown in FIGS. 2A and B is formed by assembling the net ring 3, the profile ring 4 and the holder 5, which have been described, referring to FIGS. 3 through 5. Needless to say, the order of assembly is such that the net ring 3 and the profile ring 4 are first assembled and fixedly fitted, and then the profile ring 4 is fixedly fitted to the holder 5.

Although the tapered pin hole 14', the threaded hole 15' and 16' (shown in FIG. 3B) for fixedly fitting the net ring 3 to the profile ring 4 may be formed beforehand on the net ring blank 3' it is desirable to provide the tapered pin holes 14', the threaded holes 15' and 16' after the net ring 3 formed as shown in FIG. 3D is positioned on a predetermined position of the profile ring 4. Furthermore, the ribs 6, the lugs 7 and the shoulder projections 8 of the net ring 3 may be fixedly fitted to the profile ring 4 after the net ring 3 is separated from the profile ring 4, the connecting members 21 being removed is cut, and the cut portions are finished.

Removal of the profile ring 4 and the net ring 3 from the holder 5 as in the case of changing the design of the tire can be achieved by reversing the preceding steps. Where the net ring 3 is integrally formed as shown in FIG. 3E in a tire molding mold in which the blades 10 are provided on the profile ring 4 as in the embodiment shown in FIG. 2, the net ring 3 cannot be removed from the profile ring 4 because of the interference of the blades 10. In such a case, the net ring 3 may be divided into a plurality of segments, as shown in FIG. 6A or B.

Figure 6A:
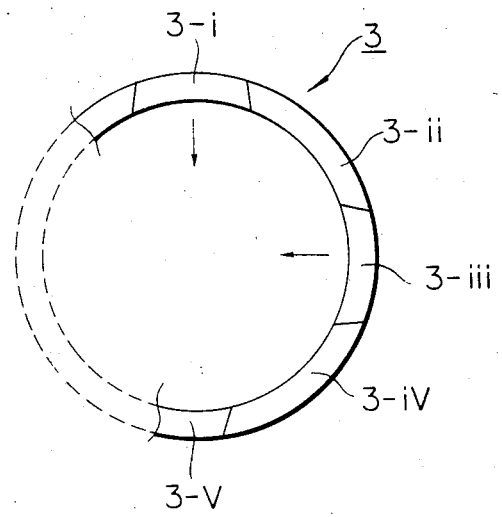
FIG. 6A and 6B are diagrams explaining the state where the net ring is split into segments.

In the embodiment shown in FIG. 6A, the net ring 3 is divided in such a manner that the arc length of the inner circumference of every second segment (for example, the segment 3-i, 3-iii, . . .) is larger than, or at least equal to, the arc length of the outer circumference thereof. With this arrangement, the net ring 3 can be removed from the profile ring 4 by first extracting the segments 3-i, 3-iii, . . . in the direction shown by an arrow in the figure, and then removing the segments 3-ii, 3-iv, . . .

Figure 6B:
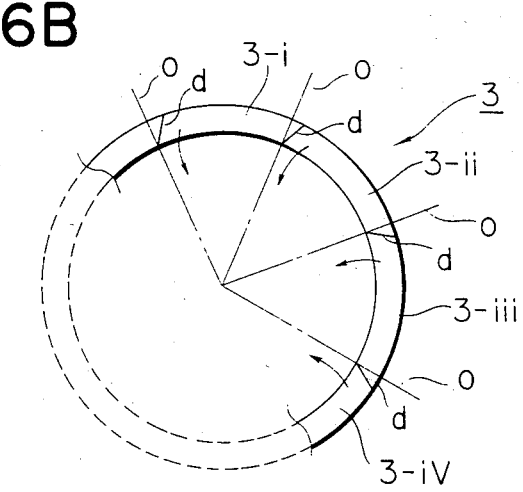

In the embodiment shown in FIG. 6B, the net ring 3 is divided in such a manner that the parting lines d of the segments 3-i, 3-ii, 3-iii, . . . intersect the central lines 0 in the same direction. With this arrangement, the net ring 3 can be easily removed from the profile ring 4 by turning an end of each segment on the same side in the direction shown by arrows in the figure.

As described above, this invention has such a construction that the net ring 3, the profile ring 4 and the holder 5 are separately manufactured, and the net ring 3 and the profile ring 4 are disposed on the holder 5. This construction makes it possible to easily change the tire design by replacing the net ring 3 and/or the profile ring 4 with new ones, with the holder 5 left intact. This construction offers not only a substantial reduction in the manufacturing cost and time of tire molding molds but also the following advantage. When the tread surface (corresponding to the inner circumferential surface 4-1 of the profile ring 4 of this invention) and the grooves (corresponding to the net ring 3 of this invention) of a tire being molded are formed simultaneously with electrodischarge machining (the so-called bottoming machining), with a tire molding mold in which the net ring 3 and the profile ring 4 of this invention are integrally formed, corner portions at which the tread surface, that is, the inner circumferential surface 4-1 of the profile ring 4 intersects the ribs are rounded due to the erosion of the electrode instead of resulting in sharp edges as shown in FIG. 2B. This necessitates the remachining of the corner portions to achieve sharp edges. In this invention where the net ring 3 is separately formed by electro-discharge machining as shown in FIG. 3, on the other hand, the faying surface 3-1 of the net ring 3 can be through-machined with the electrode 22 or 23, making it possible to form the corner portions at which the faying surface 3-1 intersects the ribs 6 into sharp edges. Thus, when the net ring 3 is disposed on the profile ring 4, the corner portions where the inner circumferential surface 4-1 of the profile ring 4 comprising the tread surface of the tire intersects the ribs 6 can be formed into sharp edges. The same applies with the corner portions at which the inner circumferential surface 4-1 intersects the lugs 7. In addition, the construction of this invention makes it possible to use laser machining, instead of electro-discharge machining to form the net ring 3.

Next, the method of degassing in the tire molding mold of this invention will be described, referring to the embodiment shown in FIG. 2. In manufacturing the net ring 3 and the profile ring 4 in the embodiment shown in FIG. 2, gas venting gaps serving as the passage of the gas evolved during tire molding can be formed at the contact portions of the net ring 3 and the profile ring 4 and of the profile ring 4 and the holder 5 by finishing at least the faying surface 3-1 of the net ring 3 and the outer circumferential surface 4-2 of the profile ring 4 into an appropriate surface roughness. This permits the gas evolved during tire molding to flow through the contact portion of the net ring 3 and the profile ring 4 into the gas vent grooves 12. The gas is then discharged to the outside through the gas vent holes 19, the contact portion of the profile ring 4 and the holder 5, and the gas vent holes 20. Since the contact portion of the net ring 3 and the profile ring 4 forms a very close gap, tire material never flows into the contact portion during tire molding, thus unwanted flashes on the tire molded can be prevented. Although it has been described in the foregoing that the outer circumferential surface 4-2 of the profile ring 4 is finished into an appropriate surface roughness to form gas vent passage, gas vent grooves (grooves similar to the gas vent grooves 12 provided on the faying surface 3-1 of the net ring 3) leading to the gas vent holes 19, 19,. . . and the gas vent holes 20, 20,. . . may be formed on the outer circumferential surface 4-2 of the profile ring 4 and the inner circumferential surface 5-1 of the holder 5.

Although the embodiment of this invention shown in FIG. 2 is composed of the net ring 3, the profile ring 4 and the holder 5, this invention is not limited to such a construction. That is, the profile ring 4 and the holder 5 may be formed integrally.

Needless to say, the term "ring" as found in the "net ring" in this invention includes a ring in which separately manufactured segments are assembled into a ring shap, or a ring which is divided into segments and reassembled into a ring shape.

As described above, this invention, in which the net ring is disposed on the profile ring, makes it possible to substantially reduce the manufacturing cost and time of tire molding molds. The faying surfaces of the net ring and the inner circumferential surface of the profile ring can be machined with high accuracy using, for example, an NC lathe, and the ribs and the lugs can be positioned on the profile ring in a state where both the ribs and the lugs are connected into a network. This results in a high precision tire molding mold. Furthermore, gas venting effects can be accomplished without producing unwanted flashes. Consequently, this invention eliminates troublesome deburring and produces no deburring marks on the tire surface, leading to improved tire appearance.

Next, a tire molding mold of a split mold type embodying this invention and the manufacturing method thereof will be described, referring to FIGS. 7 through 9. In the figures, reference numerals 10 and 21 correspond with like numerals in FIG. 2. Numeral 24 refers to a net ring; 24-1 to a faying surface; 24' to a net ring blank; 25 to an upper profile ring; 25' to a lower profile ring; 25-1 and 25'-1 to inner circumferential surfaces of the profile rings; 25-2 and 25'-2 to butt joint surfaces; 26 to a holder; 27 and 27' to shoulder portions; 28 to ribs; 29 to lugs; 30 to a bolt for connecting the profile ring; and 31 and 32 to fixing means, respectively.

Figure 7A:
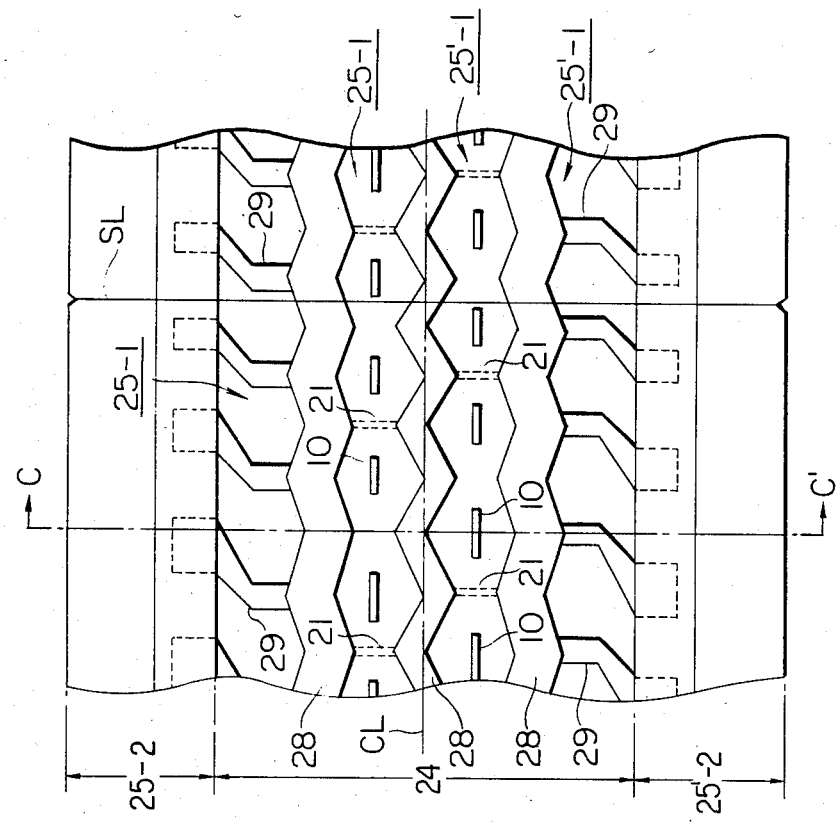
FIG. 7A is a cross-sectional view.
Figure 7B:
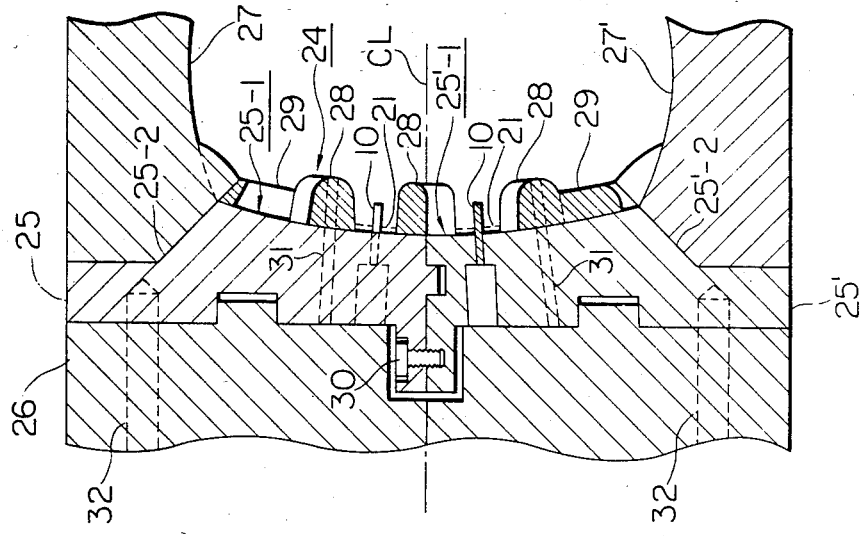
FIG. 7B is a developed plan view of the tread portion of the tire mold.

The split-mold type tire molding mold of this invention shown in FIGS. 7A and 7B has essentially the same construction as that of the embodiment shown in FIG. 2. That is, the split-mold type tire molding mold consists of the net ring 24 corresponding to the net ring 3 shown in FIG. 2, the upper profile ring 25 and the lower profile ring 25' corresponding to the profile ring 4 shown in FIG. 2, the holder corresponding to the holder 5 shown in FIG. 2, and the shoulder portions 27 and 27'. After the net ring 24 is fixedly fitted to the upper profile ring 25 and the lower profile ring 25' with the fixing means 31, such as bolts or tapered pins, the upper profile ring 25 and the lower profile ring 25' are then fixedly fitted to the holder 26 with the fixing means 32, such as bolts. As shown in FIG. 7A, the upper profile ring 25 and the lower profile ring 25' are divided at the center line CL (the equatorial plane referred to in this invention is a plane including the center line CL), and fastened together with the bolt 30. The inner circumferential surfaces 25-1 and 25'-1 of the profile rings correspond to the tread surface of a tire being molded, and the ribs 28, the lugs 29 and the blades 10 on the net ring 24 correspond to the grooves of the tire. The connecting members 21 as shown by dotted lines in the figures connect the ribs 8, 8, 8, . . . , corresponding to the connecting members 21 in the embodiment shown in FIG. 2. The connecting members 21 are provided to construct a net ring in a case where any of the ribs 28, such as the central rib 28 in the embodiment shown in FIG. 7, is not connected to the other ribs 28 or the lugs 29.

As described above, the embodiment of this invention shown in FIG. 7 has essentially the same construction as that of the abovementioned embodiment shown in FIG. 2. The profile ring is divided into two halves on the equatorial plane, as shown in the figures, to make it possible to assemble the profile ring before splitting and the net ring into one piece.

First, the manufacturing method of the embodiment of this invention shown in FIG. 7 will be described, referring to FIGS. 8 and 9. As shown in FIG. 8A, the upper profile ring 25 and the lower profile ring 25', both having the inner circumferential surfaces 25-1 and 25'-1 comprising curved surfaces corresponding to the tread surface of a tire being molded, and the butt joint surfaces 25-2 and 25'-2 which are butt jointed with the shoulder portions 27 and 27', are manufactured. FIG. 8A shows the cross-section of the upper profile ring 25 and the lower profile ring 25'. It goes without saying that both the upper and lower profile rings 25 and 25' are formed into a ring shape.

Now, the manufacturing process of the net ring 24 will be described. The net ring 24 is manufactured by applying the abovementioned manufacturing method (as shown in FIG. 3) of the net ring 3 shown in FIG. 2. That is, the net ring blank 24' shown in FIG. 8B is manufactured by machining. In machining the net ring blank 24', at least the faying surface 24-1 corresponding to the inner circumferential surfaces 25-1 and 25'-1 of the upper and lower profile rings 25 and 25' must be machined with high precision using, for example, an NC lathe. FIG. 8B shows the cross-section of the net ring blank 24', which is of course formed into a ring shape. As shown in FIG. 8C, the ribs 28 and the lugs 29 corresponding to the grooves of the tire are formed. The connecting members 21 are provided for connecting the central rib 28 which is not connected to the other ribs 28 and the lugs 29, as described above, and removed later after the net ring 24 is positioned on the upper and lower profile rings 25 and 25'.

The net ring 24, the upper and lower profile rings 25 and 25' thus manufactured are assembled in such a manner as shown in FIG. 7A. In the embodiment shown in FIG. 7, the net ring 24, the upper profile ring 25 and the lower profile ring 25' can be assembled into a ring shape because the profile ring is divided into the upper profile ring 25 and the lower profile ring 25'. After the net ring 24, the upper and lower profile rings 25 and 25' are assembled into one piece, the resulting ring is cut into a plurality of segments as shown in FIG. 9. Sector lines SL shown by dot lines in FIG. 9 represent cutting lines. When molding a tire, the cut segments are assembled into a ring shape to form a tire molding mold.

Figure 10:
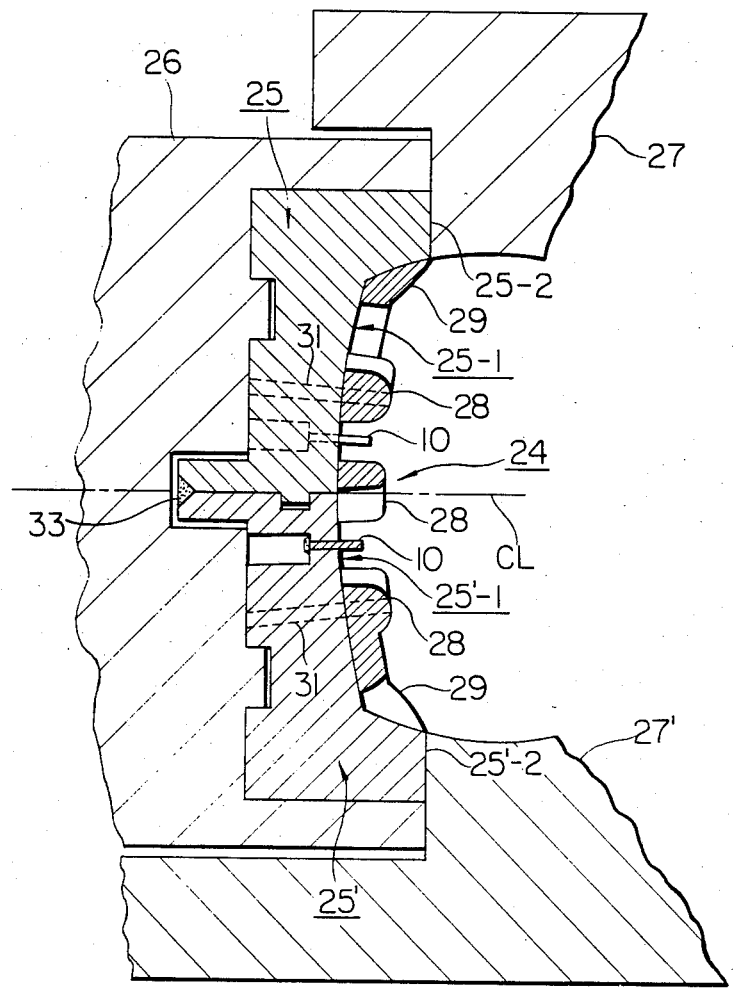
FIG. 10 is a cross-sectional view of a further embodiment of this invention.

FIG. 10 shows another embodiment of the split-mold type tire molding mold of this invention. In the abovementioned embodiment shown in FIG. 7, the lugs 29 are provided on the shoulder portions 27 and 27', while the embodiment shown in FIG. 10 has basically the same construction as that of the aforementioned embodiment shown in FIG. 7, except that all the ribs 28 and the lugs 29 are formed on the net ring 24. The manufacturing method of the embodiment shown in FIG. 7 is essentially the same as that described referring to FIGS. 8 and 9. Whereas the bolt 30 is used in the embodiment shown in FIG. 7 as a means for joining together the profile rings 25 and 25', the joined end of the profile rings 25 and 25' may be bonded by welding, as shown by a bonded portion 33 in FIG. 10.

Although the net ring 24 in the embodiments shown in FIGS. 7 and 10 as described above consists of a plurality of the ribs 28 and the lugs 29, the net ring 24 of this invention is not limited to this construction. The net ring 24 may be constructed of only the ribs 28 or the lugs 29, though not shown in the figures. In such a case, however, the net ring 24 is constructed by connecting the ribs 28 or the lugs 29 with each other by means of the connecting members 21. As described above, the unnecessary connecting members 21 may be removed after the net ring 24 is positioned on the profile rings 25 and 25'.

The embodiments shown in FIGS. 7 and 10 are constructed of the shoulder portions 27 and 27', the net ring 24, the upper and lower profile rings 25 and 25', and the holder 5. This invention, however, is not limited to this construction. The holder 5, the upper and lower profile rings 25 and 25' may be formed integrally. In such a case, the components of the mold, including a portion corresponding to the holder 5, are of course divided into halves on the equatorial plane.

Furthermore, it has been described in the description of the embodiment shown in FIG. 7 and the manufacturing method thereof that the net ring is constructed in a state where the ribs and/or the lugs are connected with the connecting members 21. The connecting members 21, however, may be omitted. That is, the ribs and/or the lugs may be manufactured separately. In such a case, the separately manufactured ribs and/or the lubs are positioned individually on the profile ring. (The same applies to the embodiment shown in FIG. 11 and the manufacturing method thereof, which will be described later.)

Still another embodiment of the split-mold type tire molding mold of this invention and the manufacturing method thereof will be dsecribed referring to FIGS. 11 through 14. In the figures, reference numeral 34 refers to a profile ring; 34-1 to the inner circumferential surface of the profile ring 34; 34-2 to the butt joint surface of the profile ring 34, respectively. Other numerals correspond with like numerals in FIGS. 2 through 9. The embodiment of the split-mold type tire molding mold of this invention shown in FIGS. 11A and 11B has essentially the same construction as that of the embodiment shown in FIG. 7. That is, the embodiment shown in FIG. 11 consists of the net ring 24, the profile ring 34 and the holder 26. Whereas the profile ring according to this invention consists of the upper profile ring 25 and the lower profile ring 25', which are divided into halves on the equatorial plane in the embodiment shown in FIG. 7, the embodiment shown in FIG. 11 can be considered essentially the same, except that the profile ring 34 is constructed integrally.

Next, the manufacturing method of the embodiment shown in FIG. 11 will be described referring to FIGS. 12 and 13. The manufacturing method of the embodiment shown in FIG. 11 is basically the same as that of the embodiment shown in FIG. 2, like the embodiment shown in FIG. 7, That is, the profile ring 34 is manufactured with precision machining in such a fashion that the inner circumferential surface 34-1 comprising a curved surface corresponding to the tread surface of a tire being molded, as shown in FIG. 12A and the butt joining surface 34-2 which is butt jointed with the shoulders 27 and 27' are provided on the profile ring 34. FIG. 12A shows the cross-section of the profile ring 34, which is of course formed integrally into a ring shape.

The manufacturing method of the net ring 24 can be considered exactly the same as that of the net ring 24 in the embodiment shown in FIG. 7. That is, the net ring 24 as shown in FIG. 12C is manufactured by, for example, electrodischarge machining the net ring blank 24' shown in FIG. 12B. FIG. 12C shows the cross-section of the net ring 24, which is formed into a ring shape as illustrated in the perspective view of FIG. 12D.

The net ring 24 formed integrally into a ring shape in this way is cut at a dotted line shown in FIG. 12D. This cutting is done because the net ring 24 in the uncut state cannot be fitted into the profile ring 34 in a state as shown in FIG. 11A since the outside diameter d of the net ring is larger than the inside diameter D of the profile ring 34 at the end of the inner circumferential surface 34-1 thereof. By cutting the net ring 24 at the dotted line, the outside diameter d of the net ring 24 can be reduced to a desired value by squeezing the net ring 24 with the opposing cut ends being staggered. Thus, the net ring 24 can be fitted into the profile ring 34. By setting the outside diameter d of the net ring 24 to a larger value corresponding to the cutting allowance, close contact can be achieved not only between the faying surface 24-1 of the net ring 24 and the inner circumferential surface 34-1 of the profile ring 34 but also between the cut ends of the net ring 24. Although the cutting of the net ring 24 at one location has been described in the above description, the cutting can be made at two or more locations.

The split-mold type tire molding mold as shown in FIG. 11 can be manufactured by dividing the assembly of the net ring 24 and the profile ring 34 into a plurality of segments as shown in FIG. 13. Sector lines SL shown by dotted lines in FIG. 13 represent cutting lines.

Figure 14A:
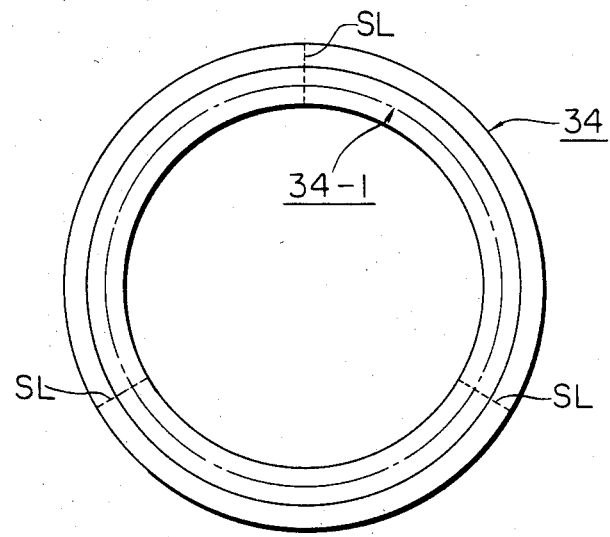
FIGS. 14A and 14B are diagrams explaining another manufacturing method of the embodiment shown in FIG. 11.
Figure 14B:
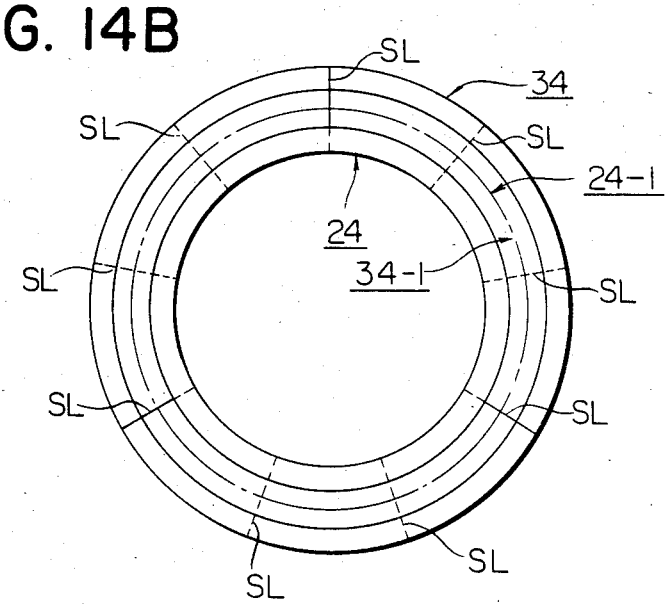

Next, the manufacturing method of the split-mold type tire molding mold of this invention will be described referring to FIGS. 14A and 14B. The manufacturing method described in reference to FIGS. 12 and 13 involves the fitting of the net ring 24 into the profile ring 34 by cutting the net ring 24. The manufacturing method shown in FIG. 14 involves the assembly of the net ring 24 and the profile ring 34 by cutting the profile ring 34. That is, the profile ring 34 is cut at a plurality of locations at sector lines SL, as shown in FIG. 14A illustrating the plan view of the profile ring 34. This is done because the assembly of the profile ring 34 and the net ring 24 is also cut at the sector lines SL, as will be described later in reference to FIG. 14B. The number of division of the profile ring 34 is desired to be a divisor of the number of final division n (the number of final division shown in FIG. 14B is 9). For example, when the number of final division is 9, as shown in FIG. 14B, the number of division of the profile ring 34 may be 3, as shown in FIG. 14A. In this way, the net ring 24 and the profile ring 34 can be assembled into one piece as shown in FIG. 14B by dividing the profile ring 34. Thus, a plurality of segments (hereinafter referred to as tread portions) can be obtained by cutting the assembly of the profile ring 34 and the net ring 24 at the sector lines SL, as with the manufacturing method described in reference to FIGS. 12 and 13.

Though not shown in the figures, the following procedures may be employed as still another manufacturing method of tire molding molds according to this invention. That is, the profile ring 34 and the net ring 24 are individually cut beforehand at the sector lines SL, and then a plurality of the net rings 24 and the profile rings 34 are assembled to form a plurality of the tread portions according to this invention. The split-mold type tire molding mold of this invention can be manufactured by assembling into a ring shape a plurality of the tread portions manufactured in accordance with any of the manufacturing methods described above.

Figure 15:
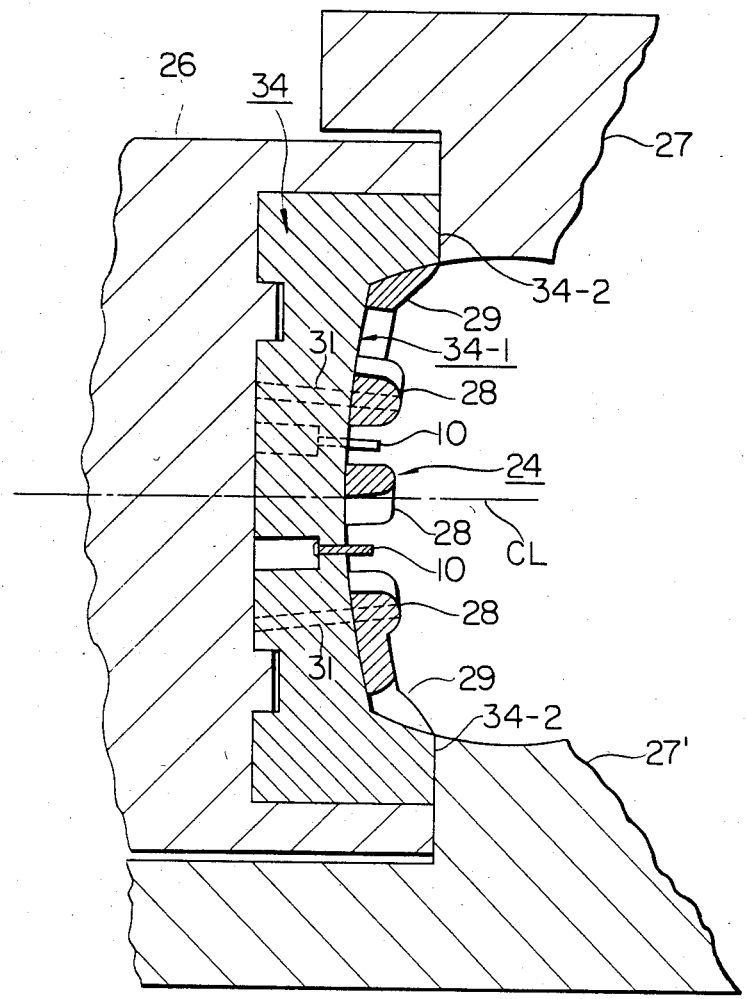
FIG. 15 is still a further embodiment of this invention.

Furthermore, a further embodiment of the tire molding mold of this invention shown in FIG. 15 has essentially the same construction as that of the embodiment shown in FIG. 11. That is, whereas the lugs 29 are provided on the shoulder portions 27 and 27' in the embodiment shown in FIG. 11, all the ribs 28 and the lugs 29 are formed on the net ring 24 in the embodiment shown in FIG. 15. The manufacturing method of the embodiment shown in FIG. 15 is also essentially the same as the manufacturing methods described in reference to FIGS. 12 through 14.

Although the net ring 24 in the embodiments described in reference to FIGS. 11 and 15 is constructed of a plurality of the ribs 28 and the lugs 29, the net ring 24 of this invention is not limited to this construction, but can be constructed of the ribs 28 or the lugs 29 alone, though not shown in the figures. In such a case, the net ring 24 can be formed by connecting the ribs 28 or the lugs 29 with each other by the abovementioned connecting members 21. After the net ring 24 is positioned on the profile ring 34, the connecting members 21 are removed, as described earlier.

Although the embodiments shown in FIGS. 11 and 15 are constructed of the shoulder portions 27 and 27', the net ring 24, the profile ring 34 and the holder 26, this invention is not limited to this construction. The abovementioned holder 26 and the profile ring 24 can be formed integrally.

As described above, this invention makes it possible to construct a plurality of split tread portions out of a net ring 24 and a profile ring, and thus to provide a split-mold type tire molding mold, which is superior in terms of accuracy and cost, and the manufacturing method thereof.

Now, blades used in the tire molding mold of this invention will be described in the following.

In order to obtain grooves on the tread surface of an automobile tire, plate-shaped projections corresponding to the grooves, called blades (for example, the blades 10, 10, . . . as shown in FIG. 2), must be formed on the contour surface (what is called the profile ring according to this invention) during the manufacture of a tire molding mold. It is generally considered difficult, however, to form the blades integrally with the mold proper by ordinary cutting or electrodischarge machining due to thin thickness of the blades. To cope with this, grooves having the cross-sectional shape corresponding to that of the blades and a predetermined depth have heretofore been formed on the contour surface using electro-discharge machining, for example, and separately machined blades have been inserted in the groove. With tire molding molds having blades installed in this way, however, blades tend to be loosened or fallen off after repeated use. In addition, it is difficult to electro-discharge machine the grooves having a desired depth and uniform groove width (in the depth direction) with high precision due to erosion of the electrode, which is often encountered with electro-discharge machining.

Electro-discharge machining accuracy can be improved to a certain extent by changing machining electrodes, but the changing of electrodes is quite troublesome. The blades can be securely fixed in position by welding or caulking after the blades are inserted into the grooves, but this involves high-precision finishing to remove welding or caulking marks on the roots of the blades.

The blades used in the tire molding mold of this invention is intended to overcome the aforementioned short-comings. In the following, the blades used in the tire molding mold of this invention will be described, referring to FIGS. 16 through 22. In the figures, reference numerals 3 through 11, 14, 17, 18, 3-1 and 4-1 correspond with like numerals in FIG. 2. Numeral 35 refers to blades; 36 and 37 to bent portions; 38 to projections; 39 through 41 to portions for determining the blade height; 42 to through holes; 43 to recesses; and 44 to bonded portions, respectively.

Figure 16A:
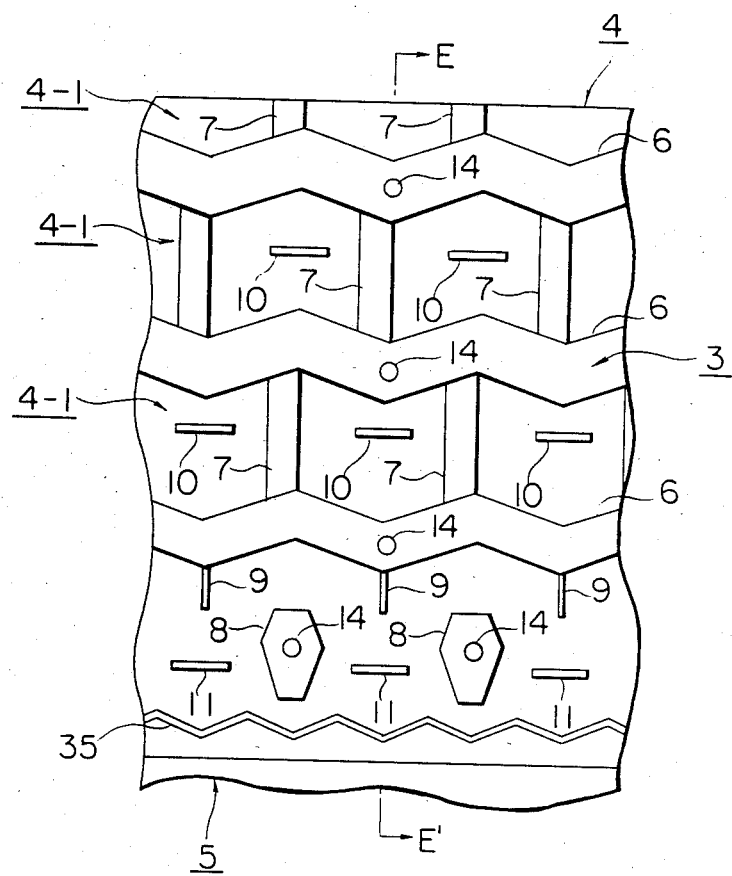
FIG. 16A is a developed plan view of the mold surface.
Figure 16B:
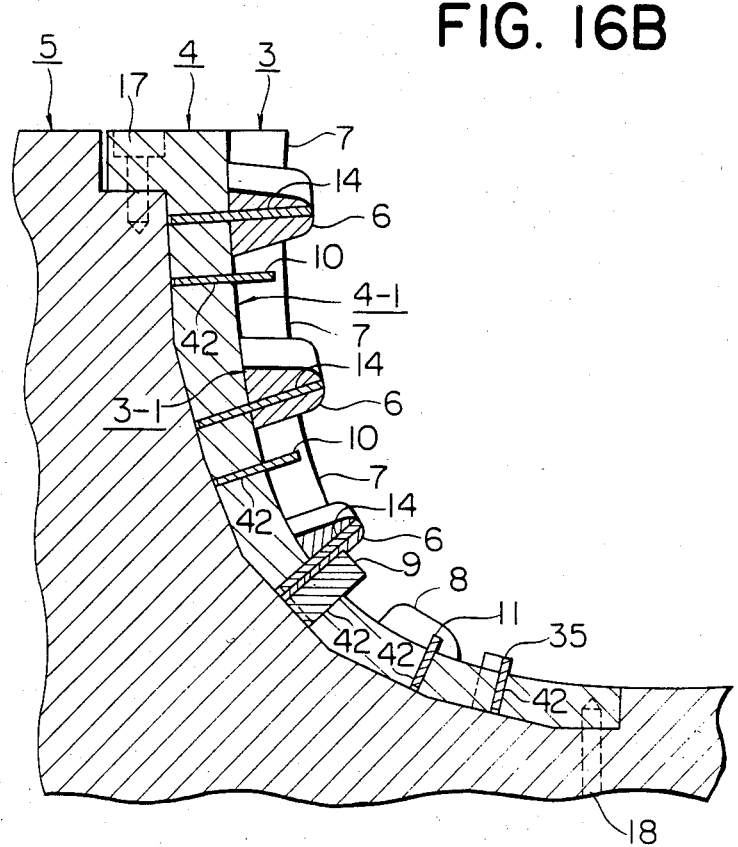
FIG. 16B is a cross-sectional view taken along line E-E' in FIG. 16A.

A tire molding mold shown in FIGS. 16A and B has essentially the same construction as that of the embodiments shown in FIGS. 2A and B. That is, the tire molding mold consists of the profile ring inner circumferential surface 4-1 (hereinafter referred to as the inner circumferential surface) having a curved surface corresponding to the tread surface of a tire being molded, the net ring 3 having the faying surface 3-1 for making contact with the inner circumferential surface 4-1 and the ribs 6 and the lugs 7 for forming the grooves of the tire being molded, and the holder 5 for supporting the profile ring 4. The net ring 3 is fixedly fitted to the profile ring 4 with the tapered pin 14 (a bolt may be used), and the profile ring 4 is fixedly fitted to the holder 5 with the bolts 17 and 18. On the profile ring 4, provided are the through holes 42, 42, . . . , into which the blades 9 through 11 are inserted. The blade 9 in the embodiment shown in FIG. 16 is provided in the immediate vicinity of the rib 6 The blades 10 and 11 are provided at a short distance from the ribs 6 and the lugs 7, and the blade 35 is provided in a continuous zigzag form, protruding from the inner circumferential surface 4-1. The through holes 42, 42, . . . can be formed with high precision by electro-discharge machining the profile ring 4 completely therethrough. The blades 9, 10, 11 and 35 can also be manufactured easily and with high precision by, for example, stamping. And, after inserted into the through holes 42, 42, . . . , the blades 9, 10, 11 and 35 can be secured in position easily and with high precision using the method that will be described later referring to FIGS. 17 through 19. Although the embodiment shown in FIG. 16 is composed of the profile ring 4, the net ring 3 and the holder 5, this invention is not limited to this construction, but can be applied to a tire molding mold in which the profile ring 4 and the holder are integrally formed. In the following, the method of installing blades according to this invention will be described.

Figure 17A:
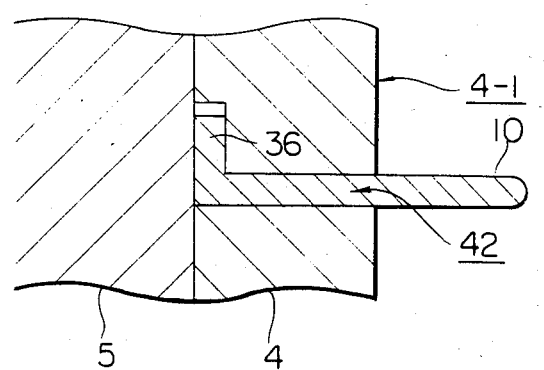
FIGS 17A through 17C, 18A and 18B, 19A and 19B, 20, 21 and 22 illustrate examples of techniques of blade installation according to this invention.
Figure 17B:
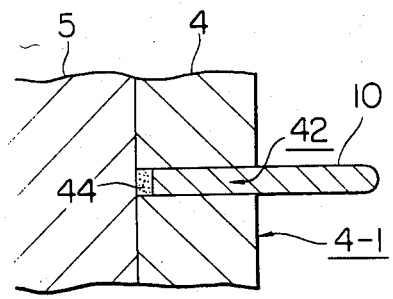
Figure 17C:
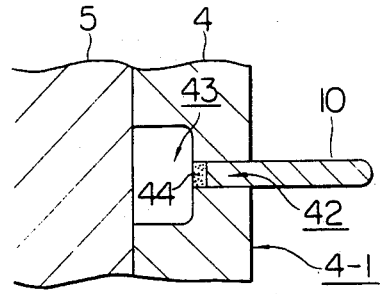

FIGS. 17A through C show examples of the methods of installing the blades 10. In the embodiment shown in FIG. 17, the blade 10 is formed into an L-shape, and the through hole 42 corresponding to the L-shaped blade 10 is provided on the profile ring 4 to install the blade 10 into the through hole 42. In this invention, the blades are installed before the profile ring 4 is secured on the holder 5. In the embodiment shown in FIG. 17A, too, the profile ring 4 is secured in position on the holder 5 only after the blade 10 is inserted into the through hole 42. In the embodiment shown in FIG. 17A, the blade 10 need not be secured to the profile ring 4 using welding or other means because the bent portion 36 is pressed by both the profile ring 4 and the holder 5. Although the blade 10 is supposed to be formed beforehand into an L-shape in the foregoing description, the blade 10 may be a flat plate, which is bent into an L-shape after inserted into the through hole 42.

In the embodiments shown in FIGS. 17B and C, the blade 10 is formed into a flat plate shape, and the through hole 42 is formed as a straight hole. The through hole 42 may be formed as a straight through hole from the inner circumferential surface 4-1 through the opposite surface, as shown in FIG. 17B, or a recess 43 is provided on the surface of the profile ring 4 faying with the holder 5, and the through hole 42 may be provided as a straight hole from the inner circumferential surface 4-1 through the recess 43. In any of the embodiments shown in FIGS. 17A and B, after the the blade 10 is inserted into the through hole 42, the blade 10 is secured to the profile ring 4 by, for example, welding or adhesive, as shown in the bonded portion 44. Deburring at the bonded portion 44 after welding is not necessary in the embodiment shown in FIG. 17C. Even in the embodiment shown in FIG. 17B, deburring is easy since it needed only to smooth out the bonded portion 44 to prevent excess metal from protruding from the faying surface with the holder 5.

The foregoing description on the blade 10 also applies to the blade 11.

Figure 18A:
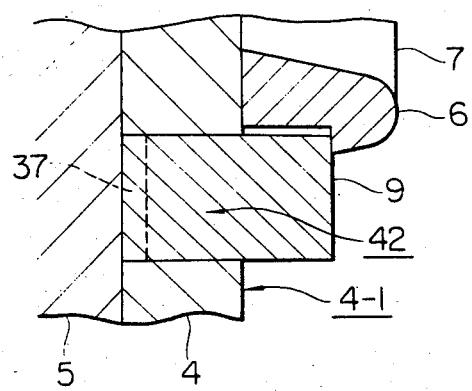
Figure 18B:
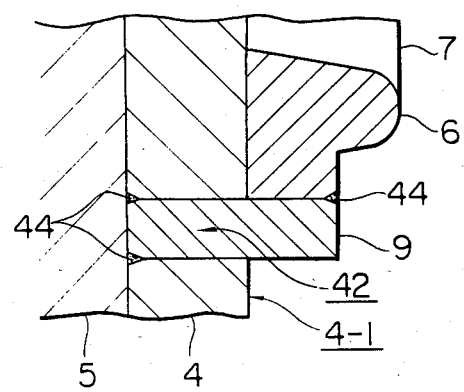

FIGS. 18A and B show the methods of installing blades (for example, the blade 11 shown in FIG. 16) in the immediate vicinity of ribs. That is, the embodiment shown in FIG. 18A corresponds to the construction having the bent portion 36 shown in the embodiment shown in FIG. 17A, while the embodiment shown in FIG. 18B corresponds to the embodiment shown in FIG. 17B. Though not shown in the figures, the installation method corresponding to the embodiment shown in FIG. 17C may be employed.

Figure 19A:
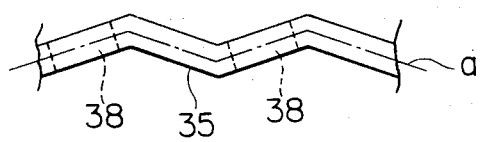
Figure 19B:
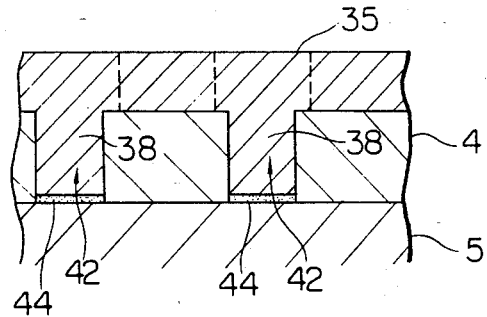

FIG. 19 shows the method of installing long blades (for example, the blade 35 shown in FIG. 16). FIG. 19A is a plan view thereof, and FIG. 19B is a cross-sectional view taken along an alternate long and short dash line a in FIG. 19A. That is, the blade 35 has the projections 38, 38, . . . at intervals along the length thereof, and the through holes 42, 42, . . . corresponding to the projections 38, 38, . . . on the profile ring 4. After the projections 38, 38, . . . are inserted into the through holes 42, 42, . . . , the blade 35 is secured to the profile ring 4 by welding the projections 38, 38, . . . to the profile ring 4 with welding or other means, as in the case of the embodiment shown in FIG. 17B. Though not shown in the figures, the installation method corresponding to the embodiment shown in FIG. 17C may be employed.

In the embodiments shown in FIGS. 17 through 19, all the through holes 42 are formed by electro-discharge machining, and the blade 9, 10, 11 or 35 is inserted into the through hole 42 and then secured to the profile ring 4 from the back side of the profile ring 4 with welding or other means. This invention, however, does not necessarily require the electro-discharge machining of all the through holes 42, but may use drilling or other simple machining operation to form the through holes 42, as in the embodiments shown in FIG. 20 through 22, which will be described later.

Figure 20:
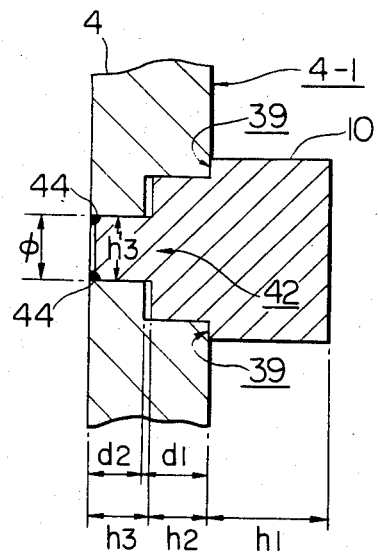

FIG. 20 shows another embodiment of the blade 10 corresponding to the embodiment shown in FIG. 17. FIG. 20 is a longitudinal section of the blade 10. The blade 10 used in the embodiment shown in FIG. 20 is formed by stamping or other forming method into a shape having shoulders as shown by arrows $h_1$, $h_2$ and $h_3$ in the figure. The through holes 42 provided on the profile ring 4 are formed in the following manner. That is, the portion of the through hole 42 shown by arrow $d_1$ in the figure is electro-discharge machined into a shape corresponding to the cross-sectional shape of the $h_2$ portion of the blade 10. The $d_2$ portion of the through hole 42 is drilled by a drilling machine or other machine tool into a diameter $\phi$ corresponding to the width $h_3'$ at the $h_3$ portion of the blade 10. The $d_1$ portion of the through hole 42 is formed by electro-discharge machining from the side of the inner circumferential surface 4-1, and the $d_2$ portion is formed by drilling from the reverse side of the inner circumferential surface 4-1. As shown in FIG. 20, after inserted into the through hole 42, the blade 10 is secured to the profile ring 4 by welding or adhesive, as shown by the bonded portion 44 in the figure. In the embodiment shown in FIG. 20, the shoulder portions between the $h_1$ and $h_2$ portions of the blade 10, that is, the portions for determining the blade height 39 and 39 make contact with the inner circumferential surface 4-1, ensuring the height of the blade 10 from the inner circumferential surface 4-1. Consequently, the electro-discharge machining of the $d_1$ portion of the through hole 42 may be performed with relatively low depth accuracy because the machining depth $d_1$ is required to be at least larger than the $h_2$ portion of the blade 10.

Figure 21:
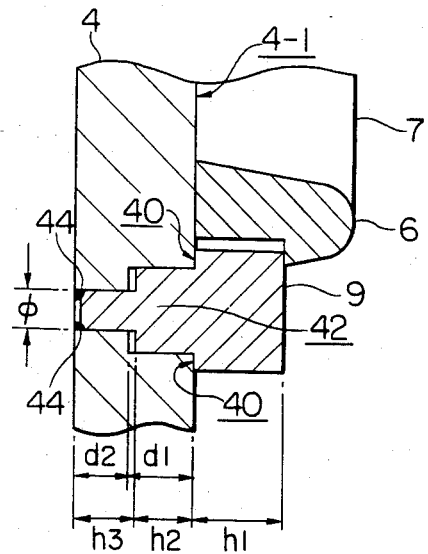
Figure 22:
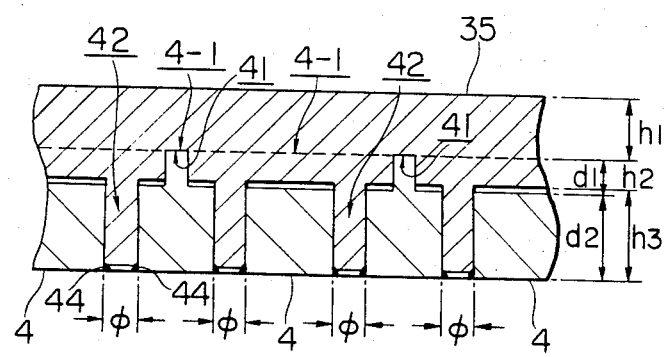

Furthermore, FIG. 21 shows still another embodiment of the blade 9 corresponding to the embodiment shown in FIG. 18, and FIG. 22 shows a further embodiment of the blade 35 corresponding to the embodiment shown in FIG. 19. Reference numerals in FIGS. 21 and 22 correspond with like numerals in the embodiment shown in FIG. 20. The through hole 42 in both the embodiments shown in FIGS. 21 and 22 consists of the $d_1$ portion formed by electro-discharge machining from the inner circumferential surface 4-1 and the $d_2$ portion drilled by a drilling machine from the reverse side of the inner circumferential surface 4-1, as in the case of the embodiment shown in FIG. 20. The blade 9 (in the embodiment shown in FIG. 21) and the blade 35 (in the embodiment shown in FIG. 22) are inserted into the through holes 42, and secured to the profile ring 4 at the bonded portion 44, as with the embodiment shown in FIG. 20. Reference numeral 40 in FIG. 21 refers to a portion for determining the height of the blade 9, and numeral 41 in FIG. 21 refers to a portion for determining the height of the blade 35, both of which correspond with the portion for determining the height of the blade 10 in the embodiment shown in FIG. 20.

As described above this invention makes it possible to provide a tire molding mold in which blades are easily and positively installed with high accuracy.

Figure 23:
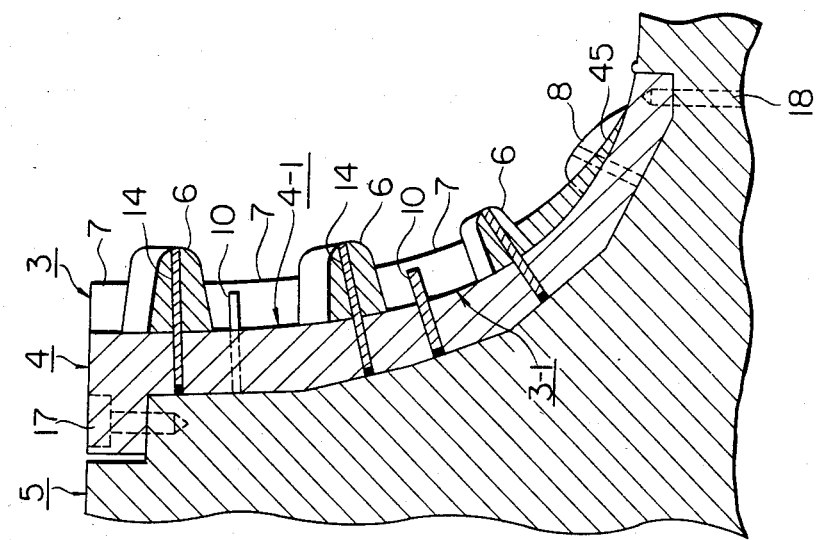
FIGS. 23A and 23B are diagrams explaining still a further embodiment of this invention having lugs with thin tips.

Now, a further embodiment of this invention will be described in the following. The embodiment shown in FIG. 23 is a tire molding mold constructed of the net ring 3, the profile ring 4 and the holder 5, as in the case of the embodiment shown in FIG. 2. In the figure, reference numeral 45 refers to lugs, and other numerals correspond with like numerals in FIG. 2.

In the embodiment shown in FIG. 23, the lugs having thin thickness at the tips thereof are provided. When the thickness of the lugs 45 is thin, as with the tips of the lugs 45 shown in FIG. 23B, the tips of the lugs 45 tend to be unwantedly bent upwards, separating from the inner circumferential surface of the profile ring 4.

Figure 24:
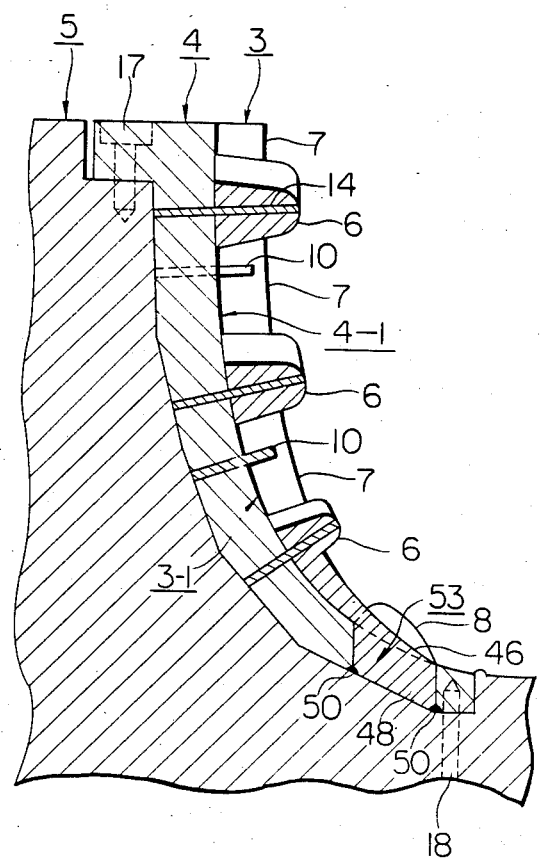
FIG. 24 is a cross-sectional view or a further embodiment of this invention.

The tire molding mold of this invention shown in FIG. 24 is intended to overcome the aforementioned problems and reinforce lugs. In the following, this embodiment will be described referring to FIGS. 24 through 26. In the figures, reference numerals 45 through 47 refer to lugs; 48 and 49 to lug projections; 50 to bonded portions; 51 to fixing holes; 52 to blade holes; 53 and 54 to lug holes; and 55 to a lug projection blank, respectively. Other numerals correspond with like numerals in FIG. 2. The embodiment shown in FIG. 24 has essentially the same construction as that of the embodiment shown in FIG. 2, consisting of the net ring 3, the profile ring 4 and the holder 5. In the embodiment shown in FIG. 24, the lug projections 48 protruding toward the profile ring 4 are provided at the lugs 46 of the net ring 3 whose mechanical strength is low due to thin thickness. On the profile ring 4, provided are the lug holes or lug recesses corresponding to the lug projections 48, through which the lug projections 48 are inserted and secured to the profile ring 4 at the bonded portions 50 and 50 by welding or adhesive. With the tire molding mold shown in FIG. 24, tires of a desired shape can be molded without causing the thin-walled portions of the net ring 3 (for example, the lugs 46 shown in FIG.

24) to be separated from the inner circumferential surface 4-1, as with the mold shown in FIG. 23, since the thin-walled portions protrudes towards the profile ring 4 and secured thereto. In the following, the profile ring 4 and the net ring 3 in the embodiment shown in FIG. 24 will be described in detail.

Figure 25A:
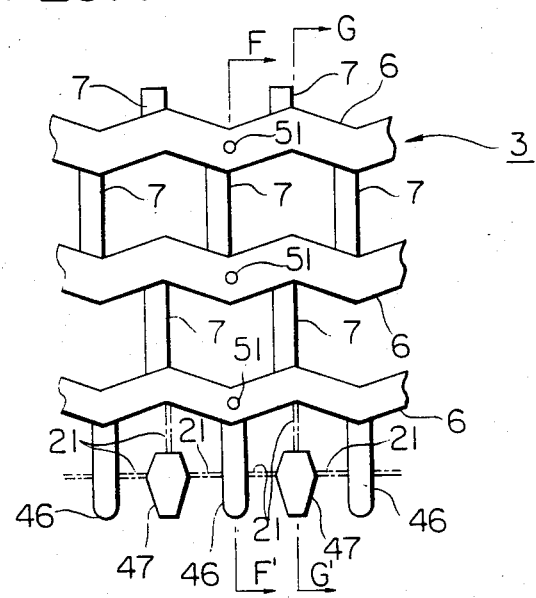
FIGS. 25A through 25D are diagrams explaining the net ring 3 in the embodiment shown in FIG. 24.
Figures 25B, 25C, 25D:
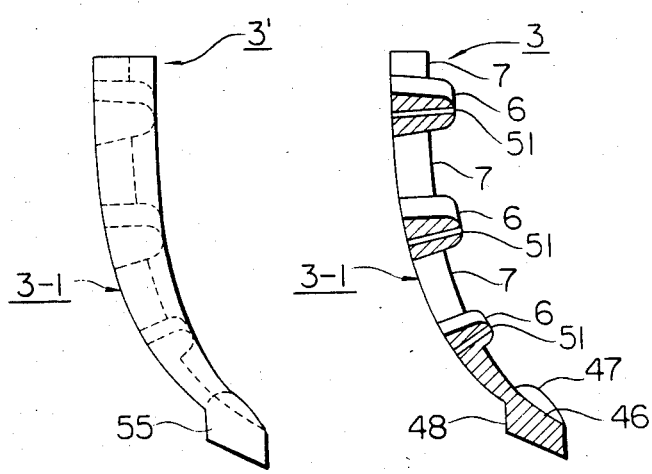

FIG. 25A is a developed plan view of the net ring 3 shown in FIG. 24. FIG. 25B is a cross-sectional view taken along line F-F' in FIG. 25A. FIG. 25C is a cross-sectional view taken along line G-G' in FIG. 25A. FIG. 25D shows the net ring blank 3'.

In order to manufacture the net ring shown in FIGS. 25A through C, the net ring blank 3' as shown in FIG. 25D is finished with high accuracy by, for example, an NC lathe. Particularly, the faying surface 3-1 and the lug projection blank 55 must be finished with high accuracy. And then, the net ring as shown in FIGS. 25A through C is manufactured from the net ring blank 3' by, for example, electro-discharge machining or NC milling. Since the lug projection blanks 55 are provided beforehand on the net ring blank 3' in this embodiment, the lug projections 48 and 49 are formed under the lugs 46 and 47 after the abovementioned electro-discharge machining. The connecting members 21 are used for connecting the lugs 47, which are provided at locations away from the ribs 6 and the lugs 46, with the ribs 6 and the lugs 46, and removed after the net ring 3 is positioned on the profile ring 4.

Figure 26A:
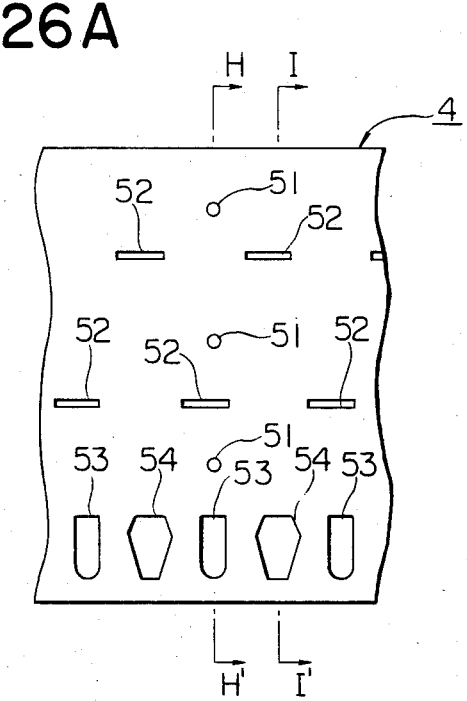
FIGS. 26A through 26C are diagrams explaining the profile ring 4 in the embodiment shown in FIG. 24.
Figure 26B:
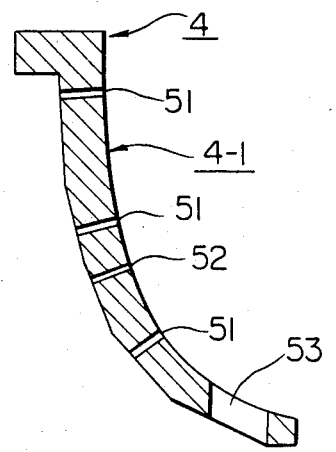
Figure 26C:
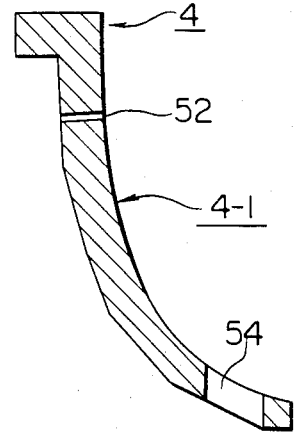

Next, the profile ring 4 will be described. FIG. 26A is a developed plan view of the profile ring shown in FIG. 24. FIG. 26B is a cross-sectional view taken along line H-H' in FIG. 26A. FIG. 26C is a cross-sectional view taken along line I-I' in FIG. 26A. The profile ring 4 in this embodiment has a cross-sectional shape as shown in FIGS. 26B and C, and the inner circumferential surface 4-1, which is machined with high accuracy by, for example, an NC lathe. On the profile ring 4, provided are the fixing holes 51 for the tapered pins 14 shown in FIG. 24, the blade holes into which the blades 10 are inserted, the lug holes 53 and 54 into which the lug projections 48 and 49 are inserted. In fixedly fitting the net ring 3 described above on the profile ring 4, the lug projections 48 and 49 of the net ring 3 are inserted into the lug holes 53 and 54 formed on the profile ring 4, and the net ring 3 is disposed on the profile ring 4 so that the faying surface 3-1 of the net ring 3 makes contact with the inner circumferential surface 4-1 of the profile ring 4. Then, the net ring 3 is secured in position on the profile ring 4, and the lug projections 53 and 54 are bonded to the profile ring 4 at the bonded portion 50, as shown in FIG. 24. The tire molding mold of this invention shown in FIG. 24 is manufactured by inserting the blades 10 into the blade holes 52, and securing the profile ring 4 onto the holder 5 with bolts 17 and 18. Although the embodiment shown in FIG. 24 is constructed of the profile ring 4, the net ring 3 and the holder 5, this invention is not limited to this construction. The profile ring 4 may be formed integrally with the holder 5.

As described above, the tire molding mold of this invention shown in FIG. 24 makes it possible to prevent lugs having low mechanical strength from falling off from the profile ring by providing projections on the lugs and forming through holes corresponding to the projections on the profile ring to increase the mechanical strength of the lugs.

What is claimed is:

1. A tire molding mold comprising; a profiled ring having an inner circumferential surface corresponding to the outer profile of a tire being molded, including at least the tread surface thereof, wherein an outer profile of a tire being molded is molded at said inner circumferential surface; and a net ring having a faying surface for making contact with said inner circumferential surface of said profile ring, said net ring comprising of a network of ribs and/or lugs for forming the grooves of said tire being molded; wherein said net ring is wholly, or with the part thereof removed, disposed on said profile ring, and is devoid of any surface corresponding to the outer profile of a tire being molded.

2. A tire molding mold as set forth in claim 1 wherein said net ring and said profile ring are radially divided into segments.

3. A tire molding mold as set forth in claim 1 wherein said profile ring is divided into segments on the equatorial plane thereof, and said profile ring and said net ring are radially divided into segments.

4. A tire molding mold as set forth in claim 1 wherein said profile ring has through holes thereon and blades which are inserted into said through holes and bonded to said profile ring on the rear side of said profile ring.

5. A tire molding mold as set forth in claim 1 wherein at least a part of said lugs have lug projections protruding beyond the faying surface thereof, and said profile ring has through holes or recesses corresponding to said lug projections; and said net ring is disposed on said profile ring after said lug projections are inserted into said through holes or recesses.

6. A tire molding mold comprising a profile ring having an inner circumferential surface corresponding to the outer profile of a tire being molded, including at least the tread surface thereof, and a net ring having a faying surface for making contact with said inner circumferential surface of said profile ringe and consisting of a network of ribs and/or lugs for forming the grooves of said tire being molded; wherein said net ring is wholly, or with the part thereof removed, disposed on said profile ring, wherein said profile ring has through holes thereon and blades which are inserted into said through holes and bonded to said profile ring on the rear side of said profile ring.

7. A tire molding mold comprising a profile ring having an iner circumferential surface corresponding to the outer profile of a tire being molded, including at least the tread surface thereof, and a net ring having a faying surface for making contact with said inner circumferential surface of said profile ringe and consisting of a network of ribs and/or lugs for forming the grooves of said tire being molded; wherein said net ring is wholly, or with the part thereof removed, disposed on said profile ring, wherein at least a part of said lugs have lug projections protruding beyond the faying surface thereof, and said profile ring had through holes or recesses corresponding to said lug projections; and said net ring is disposed on said profile ring after said lug projections are inserted into said through holes or recesses.

* * * * *